US006449712B1

(12) United States Patent
Irie et al.

(10) Patent No.: US 6,449,712 B1
(45) Date of Patent: Sep. 10, 2002

(54) EMULATING EXECUTION OF SMALLER FIXED-LENGTH BRANCH/DELAY SLOT INSTRUCTIONS WITH A SEQUENCE OF LARGER FIXED-LENGTH INSTRUCTIONS

(75) Inventors: Naohiko Irie; Tony Lee Werner, both of Santa Clara; Chih-Jui Peng, San Jose; Sebastian H. Ziesler, San Jose; Jackie A. Freeman, San Jose; Sivaram Krishnan, Los Altos, all of CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/410,851

(22) Filed: Oct. 1, 1999

(51) Int. Cl.$^7$ ................................................ G06F 9/455
(52) U.S. Cl. .................... 712/227; 712/43; 712/209; 712/226; 712/229; 712/233; 712/234; 703/26
(58) Field of Search ..................... 712/43, 209, 226, 712/227, 229, 233, 234; 703/26

(56) References Cited

U.S. PATENT DOCUMENTS

| 4,814,981 A | 3/1989 | Rubinfeld |
| 5,251,311 A | 10/1993 | Kasai |
| 5,386,565 A | 1/1995 | Tanaka et al. |
| 5,420,992 A | * 5/1995 | Killian et al. .................. 703/27 |
| 5,423,050 A | 6/1995 | Taylor et al. |
| 5,434,804 A | 7/1995 | Bock et al. |
| 5,440,705 A | 8/1995 | Wang et al. |
| 5,448,576 A | 9/1995 | Russell |
| 5,452,432 A | 9/1995 | Macachor |
| 5,455,936 A | 10/1995 | Maemura |
| 5,479,652 A | 12/1995 | Dreyer et al. |
| 5,483,518 A | 1/1996 | Whetsel |
| 5,488,688 A | 1/1996 | Gonzales et al. |
| 5,530,965 A | 6/1996 | Kawasaki et al. |
| 5,570,375 A | 10/1996 | Tsai et al. |
| 5,590,354 A | 12/1996 | Klapproth et al. |
| 5,596,734 A | 1/1997 | Ferra ........................... 395/825 |
| 5,598,551 A | 1/1997 | Barajas et al. |
| 5,608,881 A | 3/1997 | Masumura et al. |
| 5,613,153 A | 3/1997 | Arimilli et al. |
| 5,627,842 A | 5/1997 | Brown et al. ............... 371/22.3 |
| 5,657,273 A | 8/1997 | Ayukawa et al. |
| 5,664,135 A | * 9/1997 | Schlansker et al. .......... 712/201 |
| 5,682,545 A | 10/1997 | Kawasaki et al. |
| 5,704,034 A | 12/1997 | Circello .................. 395/183.14 |

(List continued on next page.)

FOREIGN PATENT DOCUMENTS

| EP | 0165600 B1 | 11/1991 |
| EP | 0636976 B1 | 2/1995 |
| EP | 0636976 A1 | 2/1995 |
| EP | 0652516 A1 | 5/1995 |

(List continued on next page.)

OTHER PUBLICATIONS

U.S. application No. 08/791,811, Nishimoto, Allowed.
U.S. application No. 08/906,883, Osada, Allowed.
U.S. application No. 08/950,664, Arakawa, Allowed.
U.S. application No. 08/950,668, Nishimoto, Allowed.
Richard York; Real Time Debug for System–on–Chip Devices; Jun. 1999; pp. 1–6.

*Primary Examiner*—William M. Treat
(74) *Attorney, Agent, or Firm*—Townsend & Townsend and Crew LLP

(57) ABSTRACT

A processor element, structured to execute a 32-bit fixed length instruction set architecture, is backward compatible for executing a 16-bit fixed length instruction set architecture by translating each of the 16-bit instructions into a sequence of one or more 32-bit instructions. The 32-bit instruction set architecture includes "prepare to branch" instructions that allow target addresses for branch instructions to be set up in advance of the branch. The 32-bit prepare to branch and branch instructions are combined to execute a 16-bit branch instruction coupled with a 16-bit Delay Slot instruction.

3 Claims, 5 Drawing Sheets

U.S. PATENT DOCUMENTS

| | | |
|---|---|---|
| 5,708,773 A | 1/1998 | Jeppesen, III et al. .. 395/183.06 |
| 5,724,549 A | 3/1998 | Selgas et al. |
| 5,737,516 A | 4/1998 | Circello et al. ........ 395/183.14 |
| 5,751,621 A | 5/1998 | Arakawa |
| 5,768,152 A | 6/1998 | Battaline et al. ....... 364/551.01 |
| 5,771,240 A | 6/1998 | Tobin et al. ................ 371/22.1 |
| 5,774,701 A | 6/1998 | Matsui et al. |
| 5,778,237 A | 7/1998 | Yamamoto et al. |
| 5,781,558 A | 7/1998 | Inglis et al. ............... 371/21.1 |
| 5,796,978 A | 8/1998 | Yoshioka et al. |
| 5,828,825 A | 10/1998 | Eskandari et al. ..... 395/183.03 |
| 5,832,248 A | 11/1998 | Kishi et al. |
| 5,835,963 A | 11/1998 | Yoshioka et al. |
| 5,848,247 A | 12/1998 | Matsui et al. |
| 5,860,127 A | 1/1999 | Shimazaki et al. |
| 5,862,387 A | 1/1999 | Songer et al. |
| 5,867,726 A | 2/1999 | Ohsuga et al. |
| 5,884,092 A | 3/1999 | Kiuchi et al. |
| 5,896,550 A | 4/1999 | Wehunt et al. |
| 5,918,045 A | 6/1999 | Nishii et al. |
| 5,930,523 A | 7/1999 | Kawasaki et al. |
| 5,930,833 A | 7/1999 | Yoshioka et al. |
| 5,944,841 A | 8/1999 | Christie ....................... 714/38 |
| 5,950,012 A | 9/1999 | Shiell et al. ................ 395/712 |
| 5,953,538 A | 9/1999 | Duncan et al. |
| 5,956,477 A | 9/1999 | Ranson et al. |
| 5,978,874 A | 11/1999 | Singhal et al. |
| 5,978,902 A | 11/1999 | Mann |
| 5,983,017 A | 11/1999 | Kemp et al. |
| 5,983,379 A | 11/1999 | Warren |
| 6,009,263 A * | 12/1999 | Golliver et al. ............. 712/200 |
| 6,023,757 A | 2/2000 | Nishimoto et al. |
| 6,038,582 A | 3/2000 | Arakawa et al. |
| 6,038,661 A | 3/2000 | Yoshioka et al. |

FOREIGN PATENT DOCUMENTS

| | | |
|---|---|---|
| EP | 0702239 A2 | 3/1996 |
| EP | 0720092 A1 | 7/1996 |
| EP | 0933926 A1 | 8/1999 |
| EP | 0945805 A1 | 9/1999 |
| EP | 0959411 A1 | 11/1999 |
| JP | PCT/JP96/02819 | 9/1996 |
| JP | 08-320796 | 12/1996 |
| JP | 8329687 A | 12/1996 |
| JP | 09-212358 | 8/1997 |
| JP | 09-311786 | 12/1997 |
| JP | 9311786 A2 | 12/1997 |
| JP | WO 9813759 A1 | 4/1998 |
| JP | 10106269 A2 | 4/1998 |
| JP | 10-106269 | 4/1998 |
| JP | 10-124484 | 5/1998 |
| JP | 10-177520 | 6/1998 |
| JP | 10177520 A2 | 6/1998 |
| SG | 55356 | 12/1998 |
| WO | WO98/13759 | 2/1998 |

* cited by examiner

| MODE B STATE | DESCRIPTION | MODE A STATE |
|---|---|---|
| PC | Program counter | Lower 32 bits of PC |
| $R_i$ where i is in [0, 15] | Mode B general-purpose registers | Lower 32 bits of $R_i$ where i is in [0, 15] |
| PR | Procedure link register | Lower 32 bits of $R_{18}$ |
| GBR | Global base register | Lower 32 bits of $R_{27}$ |
| MACL | Multiply-accumulate low | Lower 32 bits of $R_{24}$ |
| MACH | Multiply-accumulate high | Upper 32 bits of $R_{24}$ |
| T | Condition code flag | Bit 0 of $R_{25}$ |
| S | Multiply accumulate saturation flag | SR.S |
| M | Divide-step M flag | SR.M |
| Q | Divide-step Q flag | SR.Q |

FIGURE 5

EMULATING EXECUTION OF SMALLER FIXED-LENGTH BRANCH/DELAY SLOT INSTRUCTIONS WITH A SEQUENCE OF LARGER FIXED-LENGTH INSTRUCTIONS

BACKGROUND OF THE INVENTION

The invention relates generally to microprocessor/microcontroller architecture, and particularly to an architecture structured to execute a first fixed-length instruction set with backward compatibility to a second, smaller fixed instruction.

Recent advances in the field of miniaturization and packaging in the electronics industry has provided the opportunity for the design of a variety of "embedded" products. Embedded products are typically small and hand-held, and are constructed to include micro-controllers or microprocessors for control functions. Examples of embedded products include such handheld business, consumer, and industrial devices as cell phones, pagers and personal digital assistants (PDAs).

A successful embedded design or architecture must take into consideration certain requirements such as the size and power consumption of the part to be embedded. For this reason, some micro-controllers and microprocessors for embedded products are designed to incorporate Reduced Instruction Set Computing (RISC) architecture which focuses on rapid and efficient processing of a relatively small set of instructions. Earlier RISC designs, however, used 32-bit, fixed-length instruction sets. To further minimize the processing element, designs using small fixed size, such as 16-bit were developed, enabling use of compact code to reduce the size of the instruction memory. RISC architecture coupled with small, compact code permits the design of embedded products to be simpler, smaller, and power conscious. An example of such a 16-bit architecture is disclosed in U.S. Pat. No. 5,682,545.

However, the need for more computing capability and flexibility than can be provided by a 16-bit instruction set exists, and grows, particularly when the capability for graphics is desired. To meet this need, 32-bit instruction set architectures are being made available. With such 32-bit instruction set architectures, however, larger memory size for storing the larger 32-bit instructions is required. Larger memory size, in turn, brings with it the need for higher power consumption and more space, requirements that run counter to the design of successful embedded products.

Also, present 32-bit instruction set architectures provide little, if any, backward compatibility to earlier-developed, 16-bit code. As a result, substantial software investments are lost. Thus, applications using the prior, smaller, code must be either discarded or recompiled to the 32-bit instruction.

Thus, it can be seen that there is a need to provide a 32-bit instruction architecture that imposes a negligible impact on size and power consumption restraints, as well as providing a backward compatibility to earlier instruction set architectures.

SUMMARY OF THE INVENTION

Broadly, the present invention is directed to a processor element, such as a microprocessor or a micro-controller, structured to execute either a larger fixed-length instruction set architecture or an earlier-designed, smaller fixed-length instruction set architecture, thereby providing backward compatibility to the smaller instruction set. Execution of the smaller instruction set is accomplished, in major part, by emulating each smaller instruction with a sequence of one or more of the larger instructions. In addition, resources (e.g., registers, status bits, and other state) of the smaller instruction set architecture are mapped to the resources of the larger instruction set environment.

In an embodiment of the invention, the larger instruction set architecture uses 32-bit fixed-length instructions, and the smaller instruction set uses 16-bit fixed length instructions. However, as those skilled in this art will see, the two different instruction sets may be of any length. A first group of the 16-bit instructions will each be emulated by a single 32-bit instruction sequence. A second group of the 16-bit instructions are each emulated by sequences of two or more of the 32-bit instructions. Switching between the modes of execution is accomplished by branch instructions using target addresses having a bit position (in the preferred embodiment the least significant bit (LSB)) set to a predetermined state to identify that the target of the branch is a member of one instruction set (e.g., 16-bit), or to the opposite state to identify the target as being a member of the other instruction set (32-bit).

The particular 16-bit instruction set architecture includes what is called a "delay slot" for branch instructions. A delay slot is the instruction immediately following a branch instruction, and is executed (if the branch instruction so indicates) while certain aspects of the branch instruction are set up, and before the branch is taken. In this manner, the penalty for the branch is diminished. Emulating a 16-bit branch instruction that is accompanied by a delay slot instruction is accomplished by using a prepare to branch (PT) instruction in advance of the branch instruction that loads a target register. The branch instruction then uses the content of the target register for the branch. However, when emulating a 16-bit branch instruction with a delay slot requirement, the branch is executed, but the target instruction (if the branch is taken) is held in abeyance until emulation and execution of the 16-bit delay slot instruction completes.

The 32-bit PT instruction forms a part of a control flow mechanism that operates to provide low-penalty branching in the 32-bit instruction set environment by separating notification of the processor element of the branch target from the branch instruction. This allows the processor hardware to be made aware of the branch many cycles in advance, allowing a smooth transition from the current instruction sequence to the target sequence. In addition, it obviates the need for the delay slot technique use in the 16-bit instruction set architecture for minimizing branch penalties.

A feature of the invention provides a number of general purpose registers, each 64-bits in length, for use by either the 16-bit instructions or the 32-bit instructions. However, when a general purpose register is written or loaded by a 16-bit instruction, only the low order 32-bits are used. In addition, an automatic extension of the sign bit is performed when most 16-bit instructions load a general purpose register; that is, the most significant bit of the 32-bit quantity placed in the low-order bit positions of a 64-bit general purpose register are copied to all 32 of the high-order bits of the register. The 32-bit instruction set architecture includes instructions structured to use this protocol, providing compatibility between the 16-bit and 32-bit environments.

Also, a 64-bit status register is provided for both the 16-bit instruction set and the 32-bit instruction set. Predetermined bit positions of the status register are reserved for state that is mapped from the 16-bit instruction set. Other of the 16-bit state is mapped to predetermined bit positions of certain of the general purpose registers. This mapping of the 16-bit instruction set state allows separate environments (16-bit, 32-bit) to save all necessary context on task switching, and facilitates emulation of the 16-bit instructions with 32-bit instructions.

A number of advantages are achieved by the present invention. The ability to execute both 16-bit code and 32-bit code allows a processor to use the compact, 16-bit code for the mundane tasks. This, in turn, allows a saving of both memory space and the other advantages attendant with that saving (e.g., smaller memory, reduced power consumption, and the like). The 32-bit code can be used when more involved tasks are needed.

Further, the ability to execute an earlier-designed 16-bit instruction set architecture provides a compatibility that permits retention of the investment made in that earlier design.

The PT instruction, by providing advance notice of a branch, allows for more flexibility in the performance of branch instructions.

These and other advantages and features of the present invention will become apparent to those skilled in this art upon a reading of the following detailed description which should be taken in conjunction with the accompanying drawings.

BRIEF DESCRIPTION OF THE DRAWINGS

FIG. 5 illustrates state mappings from one instruction set architecture to a second instruction set architecture.

DESCRIPTION OF THE SPECIFIC EMBODIMENTS

The present invention preferably provides backward compatibility to a previously-developed 16-bit fixed-length instruction set architecture. A more complete description of that architecture may be found in "SH7750 Programming Manual" (Rev. 2.0, Copyright Mar. 4, 1999), available from Hitachi Semiconductor (America) Inc., 179 East Tasman Drive, San Jose, Calif. 95134.

Figure 1:
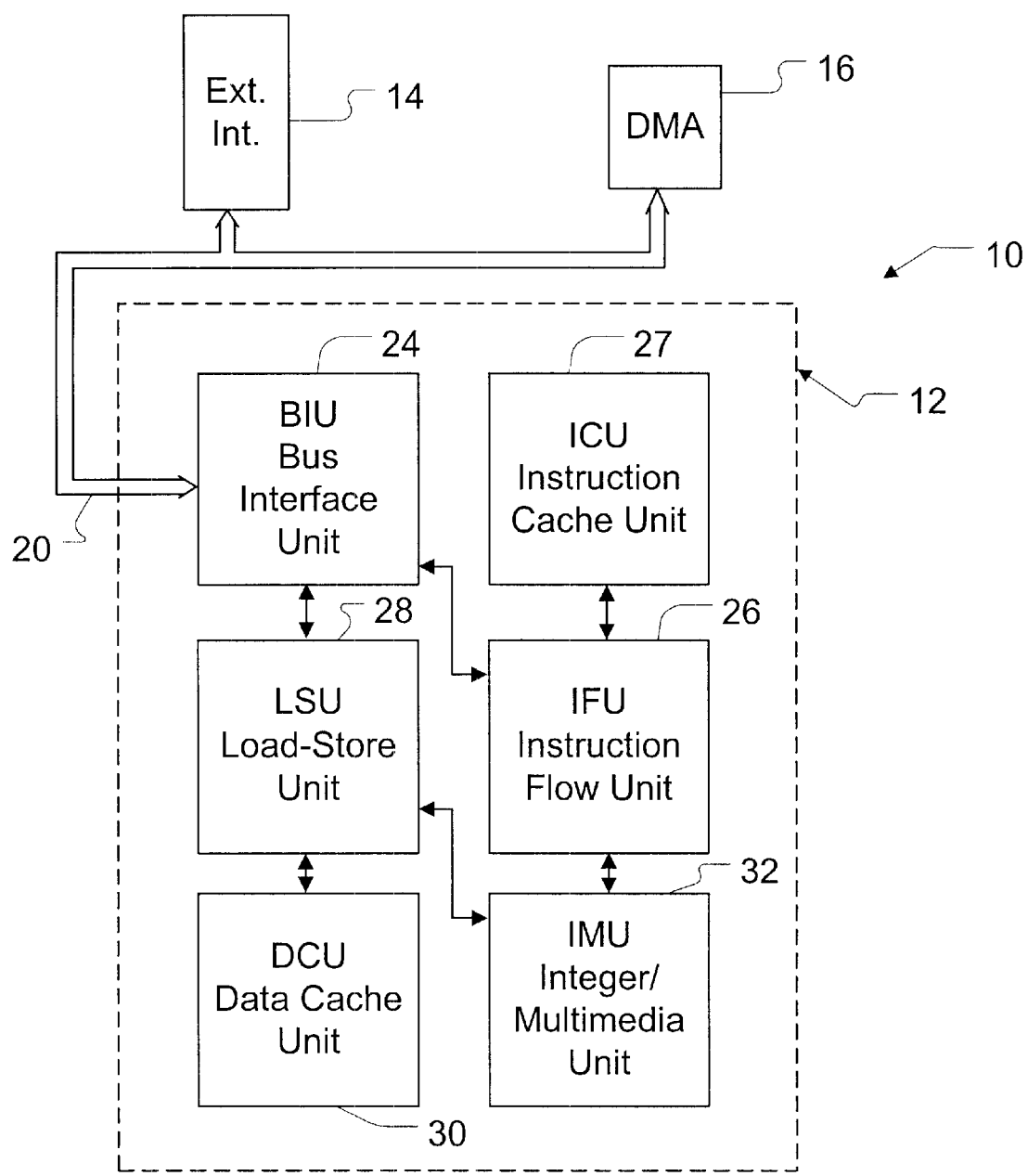
FIG. 1 is a block diagram broadly illustrating a processing system employing a processor element constructed to implement the present invention.

Turning now to the Figures, and for the moment specifically to FIG. 1, there is illustrated, in broad form, a block diagram of the processor element (e.g., microcomputer) constructed in accordance with the teachings of the present invention. As shown in FIG. 1, a processor system, identified generally with the reference numeral 10, includes a processor element 12, an external interface 14, and a direct memory access (DMA) unit 14 interconnected by a system bus 20. Preferably, the external interface 14 is structured to connect to external memory and may also provide the processor element 12 with communicative access to other processing elements (e.g., peripheral devices, communication ports, and the like).

FIG. 1 also illustrates the logical partitioning of the processor element 12, showing it as including a bus interface unit (BIU) 24 that interfaces the processor unit 12 with the external interface 14 and DMA 16. The BIU 24, which handles all requests to and from a system bus 20 and an external memory (not shown) via the external interface 14, communicatively connects to an instruction flow unit (IFU) 26. The IFU 26 operates to decode instructions it fetches from the instruction cache unit (ICU) 27, and serves as the front end to an instruction decode and execution pipeline. As will be seen, the IFU 26 contains the translation logic for emulating a 16-bit instruction set with sequences of 32-bit instructions set according to the present invention. (Hereinafter, the 16-bit instruction set architecture will be referred to as "Mode B," and the 32-bit instruction set architecture will be referred to as "Mode A.")

The BIU 24 also connects to a load-store unit (LSU) 28 of the processor element 12 which handles all memory instructions and controls operation of the data cache unit (DCU) 30. An integer/multimedia unit (IMU) 32 is included in the processor element 12 to handle all integer and multimedia instructions and forms the main datapath for the processor element 12.

In major part, the IFU 26 functions as the sequencer of the processor element 12. Its main function is to fetch instructions from the ICU 27, decode them, read operands from a register file 50 (FIG. 2), send the decoded instructions and the operands to the execution units (the IMU 32 and LSU 28), collect the results from the execution units, and write them back to the register file. Additionally, the IFU 26 issues memory requests to the BIU 24 on instruction cache misses to fill the instruction cache with the missing instructions from external memory (not shown).

Another major task of the IFU is to implement the emulation of Mode B instructions. Specifically, all Mode B instructions are translated so that the particular Mode B instruction is emulated by either one of the Mode A instructions, or a sequence of Mode A instructions The Mode A instructions are then executed with very little change to the original Mode A instruction semantics. This approach allows the circuitry and logic necessary for implementing Mode B instruction to be isolated within a few functional logic blocks. This, in turn, has the advantage of permitting changes in the Mode B instruction set at some future date, or perhaps more importantly, being able to remove the Mode B instruction set altogether.

Figure 2:
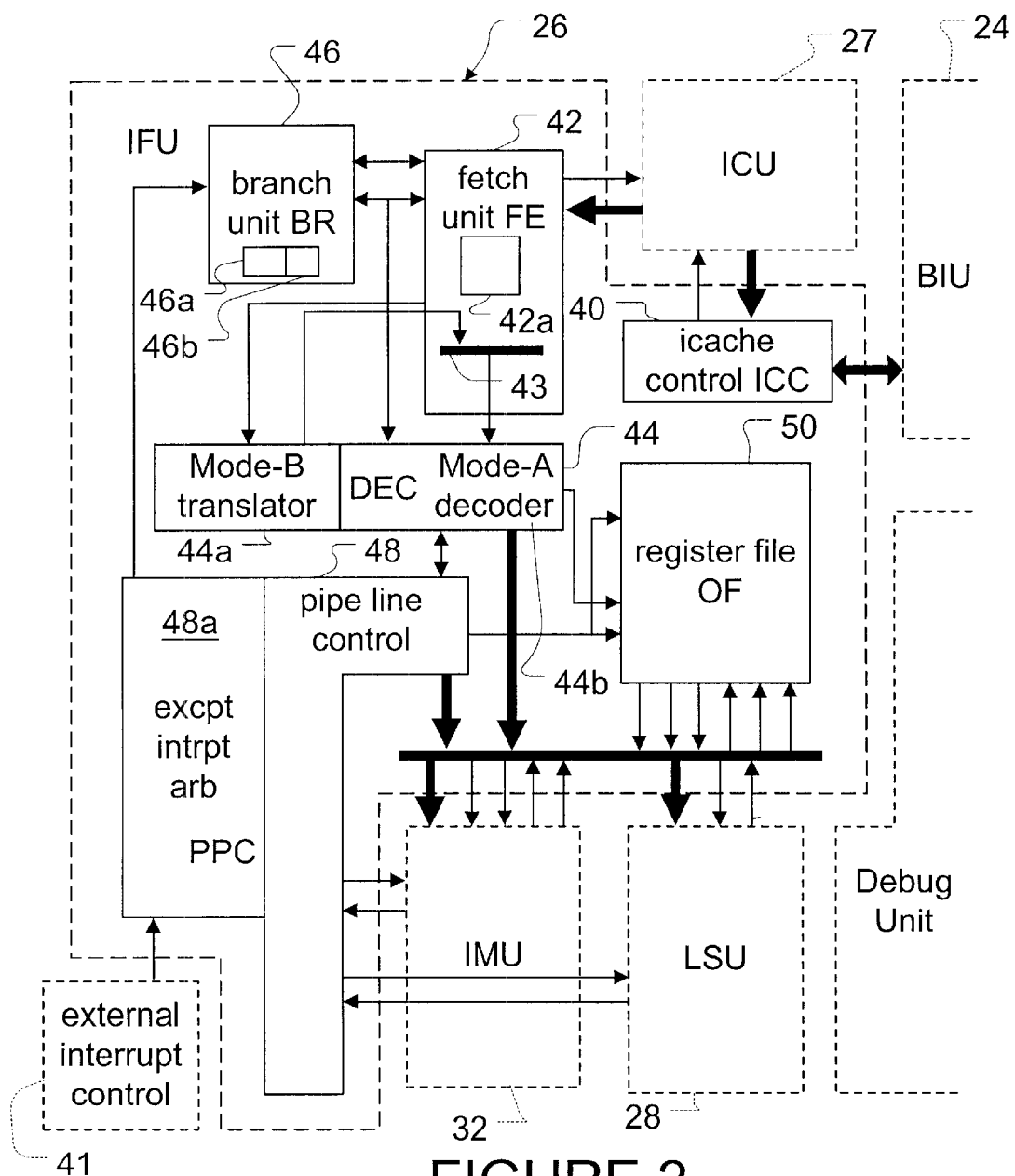
FIG. 2 is a block diagram illustration of the instruction fetch unit (IFU) of the processor element shown in FIG. 1.

FIG. 2 is a block diagram of the IFU 26 illustrating it in somewhat greater detail. Because of the sequencing role played by the IFU 26 within the processor element 12, the IFU interfaces with almost every other unit of the processor element 12. The interface between the IFU 26 and both the BIU 24 and ICU 27 is established by the ICACHE) instruction cache (control (ICC) 40 which handles the loading of instructions into the ICU 27, and the flow of instructions from the ICU 27 for execution. The interface between the ICU 27 and the LSU 28 and IMU 32 provides the paths for sending/receiving instructions, operands, results, as well as all the control signals to enable the execution of instructions. In addition to these interfaces, the IFU 26 also receives external interrupt signals from an external interrupt controller 41 which samples and arbitrates external interrupts. The IFU 26 will then arbitrate the external interrupts with internal exceptions, and activate the appropriate handler to take care of the asynchronous events.

As FIG. 2 shows, the ICC 40 communicates internally with a fetch unit (FE) 42 and externally with the ICU 27 to set up accesses. Normally, the FE 42 provides an instruction fetch address and a set of control signals indicating a "fetch demand" to the ICC 40. In return, the ICC 40 sends up to two word-aligned, instruction words back to the FE 42. When the ICU 27 misses, the ICC 40 will initiate a refill cycle to the BIU 24 to load the missing cache line from the external memory (not shown). The refill occurs while the FE 42 is holding the original fetch address. Alternatively, the FE 42 may provide a "prefetch request" which requires no instruction returned, or a "fetch request," which requires no refill activity when a cache miss is experienced.

Instructions fetched from the ICU 27 by the FE 42 are first deposited in a buffer area 42a in accordance with the instruction set architecture mode of the instructions (i.e., whether Mode B or Mode A). Eventually, however, the instructions will be transported into one of two instruction buffers for application to a decode (DEC) unit 44.

When the processor element 12 is executing Mode A instructions, the DEC 44 will decode the instruction and send the decoded instruction information to the FE 42, the branch unit (BR) 46, and the pipeline control (PPC) 48, and externally to the IMU 32 and the LSU 28. The information will also allow the IMU 32 and the LSU 28 to initiate data operations without further decoding the instruction. For branch instructions, the partially decoded branch information enables the BR 46 to statically predict the direction of the branches at the earliest possible time.

When Mode B instructions are executing, all instructions will go through an additional pipeline stage: the Mode B translator 44a of the DEC 44. The Mode B translator 44a will translate each Mode B instruction into one or multiple Mode A emulating instructions. The Mode A emulating instructions are then moved to a buffer of the DEC 44 where normal Mode A instruction decoding and execution resumes. As an example, Appendix A hereto shows, for each of Mode B move and arithmetic instructions, the Mode A instruction sequences used to emulate the Mode B instruction. (The Mode B instruction set comprises many more instructions, including floating point instructions, as can be seen in the SH7750 programming manual identified above. Appendix A is used only to illustrate emulation. As those skilled in this art will recognize, the emulation sequence depends upon the particular instruction set architectures.

In addition, in order to ensure compatibility when processing 32-bit data, additional Mode A instructions are included in the Mode A instruction set for emulating the Mode B (32-bit data) instructions. These additional instructions, shown in Appendix B, operate to handle 32-bit data by retrieving only the lower 32 bits of the source register(s) identified in the instruction. Any result of the operation will be written to the lower 32 bits of the destination register identified in the instruction, and the sign bit of the written quantity (i.e., the most significant bit) will be extended into the upper 32 bits of the destination register.

An example of the emulation of a Mode B instruction by a Mode A instruction is illustrated by the Mode B add (ADD) instruction shown in Appendix A. This is one of the Mode B instructions that is emulated by a single Mode A instruction, an add long (add.l) instruction. In the Mode B instruction set architecture, the ADD instruction will add the contents of two 16 general purpose registers $R_m$, $R_n$ to one another and store the result in the general purpose register Rn. (As will be seen, the 16 general purpose registers ($R_0$–$R_{15}$) are mapped to the low-order 32 bits of the 64-bit general purpose registers ($R_0$–$R_{15}$) 50.) Emulation of this Mode B ADD instruction uses the Mode A add long (add.l) instruction which uses only the low-order 32-bits of the general purpose registers. Add.l operates to add the content of general purpose register Rm to the content of general purpose register Rn and store the result in the low-order 32 bits of the general purpose register Rn with automatic extension of the sign bit into the high-order 32 bits of the register. Thereby, the Mode B ADD instruction is emulated by the Mode A add.l instruction to perform the same task, and obtain the same 32-bit result. (Mode A instructions use the entire 64 bits of the general purpose registers. If a value to be written to a register is less than the full 64 bits, whether written by a Mode B instruction or a Mode A instruction, the sign of that value is extended into the upper bit positions of the register—even for most unsigned operations. This allows the result of Mode B or Mode A operation to be considered as producing a 64-bit result.) For the Mode B instruction set, as described in the SH 7750 Programming Manual identified above, the added Mode A instructions are set forth in Appendix B hereto.

An example of an emulation of a Mode B instruction by a sequence of two or more Mode A instructions is shown in Appendix A by the Mode B add-with-carry (ADDC) instruction. The ADDC instruction is similar to the ADD instruction, except that the content of the registers Rm, Rn are treated as unsigned numbers, and the sum will include a carry produced by a prior addition—stored in a 1-bit T register of the Mode B instruction set architecture. If the ADDC produces a carry, it is stored in the 1-bit T register in the Mode B environment for use by a subsequent ADDC instruction, or for other operations. This requires emulation by a sequence of Mode A instructions. (References to registers are the 64-bit general purpose registers contained in the register file 50 of FIG. 2) As can be seen, the ADDC instruction is emulated by a sequence of six Mode A instructions:

1. A Mode A add unsigned long (addz.l) instruction adds the low-32 bits of the general purpose register $R_m$ to the general purpose register $R_{63}$, (which is a constant "0") and returns the result to a general purpose register $R_{32}$, used as a scratch pad register, with zeros extended into the high-order 32 bits of the result.
2. Next, an addz.l adds the low-32 bits of the general purpose register $R_n$ to the general purpose register $R_{63}$, and returns the result to the general purpose register $R_n$ with zeros written into the high-order 32 bits of the result.
3. Then, the Mode A add instruction adds the contents of $R_n$ and $R_{32}$ to one another (both of which have a 32-bit quantity in the 32 low-order bit positions, and zeros in the 32 high-order bit positions), storing the result in the register $R_n$.
4. The Mode A add instruction adds the result, now in register Rn to whatever carry was produced earlier and placed in the LSB of general purpose register $R_{25}$, and returns the result to register $R_n$.

Since the result of step 4 may have produced a carry, that would have been set in the 1-bit T register, in the Mode B environment the register to which the T register is mapped (the LSB of general purpose register $R_{25}$) is loaded with carry during the remaining steps of the emulation:

5. The value held in $R_n$ is shifted right 32 bit positions to move any carry produced from the addition into the LSB of the value and writes the result to $R_{25}$.
6. Finally, since the content of the register $R_n$ is not a sign-extended value, the Mode A add immediate instruction adds the content to zero and returns the sign-extended result to $R_n$.

There are also Mode B instructions that are emulated in a single Mode A instruction or a sequence of two Mode A instructions, depending upon the registered values used by the instruction. An example of this dual personality emulation are the three Move data instructions in which the source operand is memory (MOV.B, MOV.W, and MOV.L where the source is @$R_m$). In the Mode B environment these instructions will retrieve the data in memory at the memory location specified by the content of the general purpose register $R_m$, add it to the content of the register Rn and return the result to the register $R_n$. Then, if m is not equal to n (i.e., the data is being moved to any other register than the one that held the memory address), the content of the register $R_m$ is incremented. As can be seen in Appendix A, only one instruction is used if the data is moved from memory to the general purpose register holding the memory address of that data. If, on the other hand, the data is being moved elsewhere, the memory address is incremented by the second instruction.

Returning to FIG. 2, the BR 46 handles all branch related instructions. It receives the decoded branch instructions from the DEC 44, determines whether branch conditions and target addresses are known, and proceeds to resolve/predict the branch. If the branch condition is unknown, the BR 46 will predict the branch condition statically. The predicted instruction will then be fetched and decoded. In some instances, the predicted instruction may be fetched and decoded before the branch condition is resolved. When this happens, the predicted instruction will be held in the decode stage until the BR 46 is sure that the prediction is correct.

Figure 3:
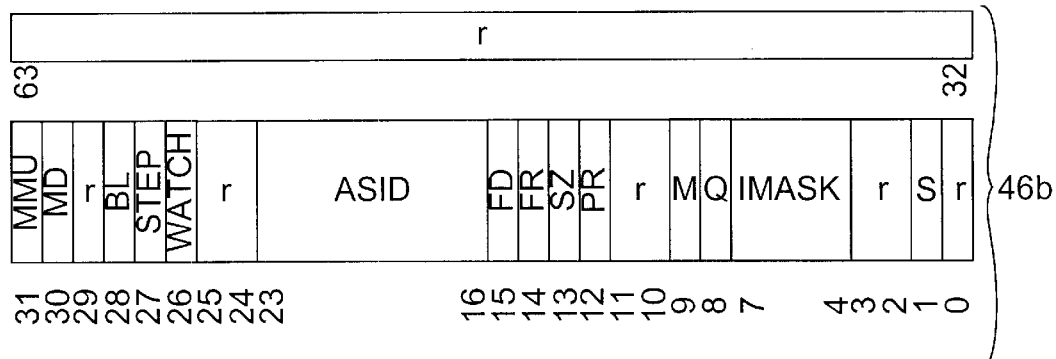
FIG. 3 is a layout of a status register contained of the branch unit shown in FIG. 2.

The BR 46 includes 8 target address registers 46a as well as a number of control registers, including status register (SR) 46b (FIG. 3). Branches are taken in part based upon the content of one or another of the target address registers 46a. A specific target address register can be written with a target address at any time in advance of an upcoming branch instruction in preparation of the branch, using a prepare to branch (PT) instruction. As will be discussed more fully, use of the target address registers 46a to prepare for a branch in advance reduces the penalty of that branch.

The (SR) 46b is a control register that contains fields to control the behavior of instructions executed by the current thread of execution. Referring for the moment to FIG. 3, the layout of SR 46b is shown. The "r" fields (bit positions 0, 2–3, 10–11, 24–25, 29, and 32–63) indicate reserved bits. Briefly, the fields of SR 46b pertinent to the present invention behave as follows:

The 1-bit fields S, Q, and M (bit positions 1, 8, and 9, respectively) are used during the emulation of Mode B instructions with Mode A instructions during certain arithmetic operations not relevant to the understanding of the present invention. These bit positions are state mapped from the Mode B instruction set architecture environment for use in emulating Mode B instructions with the Mode A instruction set architecture.

The 1-bit fields FR, SZ and PR (bit positions 14, 13, and 12, respectively) are used to provide additional operation code qualification of Mode B floating-point instructions.

The Mode B instruction set architecture also uses a 1-bit T register for, among other things, keeping a carry bit resulting from unsigned add operations. The Mode B T register is, as indicated above, mapped to the LSB of the general purpose register R25. Other mappings will be described below. It will be appreciated, however, by those skilled in this art that the particular mappings depend upon the particular instruction set architecture being emulated and the instruction set architecture performing the emulation.

Once instructions are decoded by the DEC 44, the PPC 48 monitors their execution through the remaining pipe stages—such as the LSU 28 and/or IMU 32. The main function of the PPC 48 is to ensure that instructions are executed smoothly and correctly and that (1) instructions will be held in the decode stage until all the source operands are ready or can be ready when needed (for IMU 32 multiply-accumulate internal forwarding), (2) that all synchronization and serialization requirements imposed by the instruction as well as all internal/external events are observed, and (3) that all data operands/temporary results are forwarded correctly.

To simplify the control logic of the PPC 48, several observations and assumptions on the Mode A instruction set execution are made. One of those assumptions is that none of the IMU instructions can cause exception and all flow through the pipe stages deterministically. This assumption allows the PPC 48 to view the IMU 32 as a complex data operation engine that doesn't need to know where the input operands are coming from and where the output results are going.

Another major function of the PPC 48 is to handle non-sequential events such as instruction exceptions, external interrupts, resets, and the like. Under normal execution conditions, this part of the PPC 48 is always in the idle state. It awakens when an event occurs. The PPC 48 receives the external interrupt/reset signals from an external interrupt controller (not shown), and internal exceptions from many parts of the processor element 12. In either case, the PPC 48 will clean up the pipeline, and inform the BR 46 to save core state and branches to the appropriate handler. When multiple exceptions and interrupts occur simultaneously, an exception interrupt arbitration logic 48a of the PPC 48 arbitrates between them according to the architecturally defined priority.

The general purpose registers mentioned above, including registers $R_0$–$R_{63}$, are found in a register file (OF) 50 of the IFU 26. Each of the general purpose registers is 64-bits wide. Control of the OF 50 is by the PPC 48. Also, the general purpose register $R_{63}$ is a 64-bit constant (a "0").

The Mode B translator 44a of the DEC 44 is responsible for translating Mode B instructions into sequences of Mode A instructions which are then conveyed to the Mode A decoder 44b of the DEC for decoding. For Mode B translation, the DEC looks at the bottom 16 bits of the instruction buffer 42a of the FE 42, and issues one Mode A instruction per cycle to emulate the Mode B instruction. The Mode A instruction is routed back to a multiplexer 43 of the FE 42 and then to the Mode A decoder 44b. A translation state is maintained within the DEC 44 to control the generation of the Mode B emulating sequences. When all emulating instructions are generated, the DEC 44 informs the FE 42 to shift to the next Mode B instruction, which can be in the top 16 bits of the instruction buffer 42a or the bottom 16 bits of the buffer.

Figure 4:
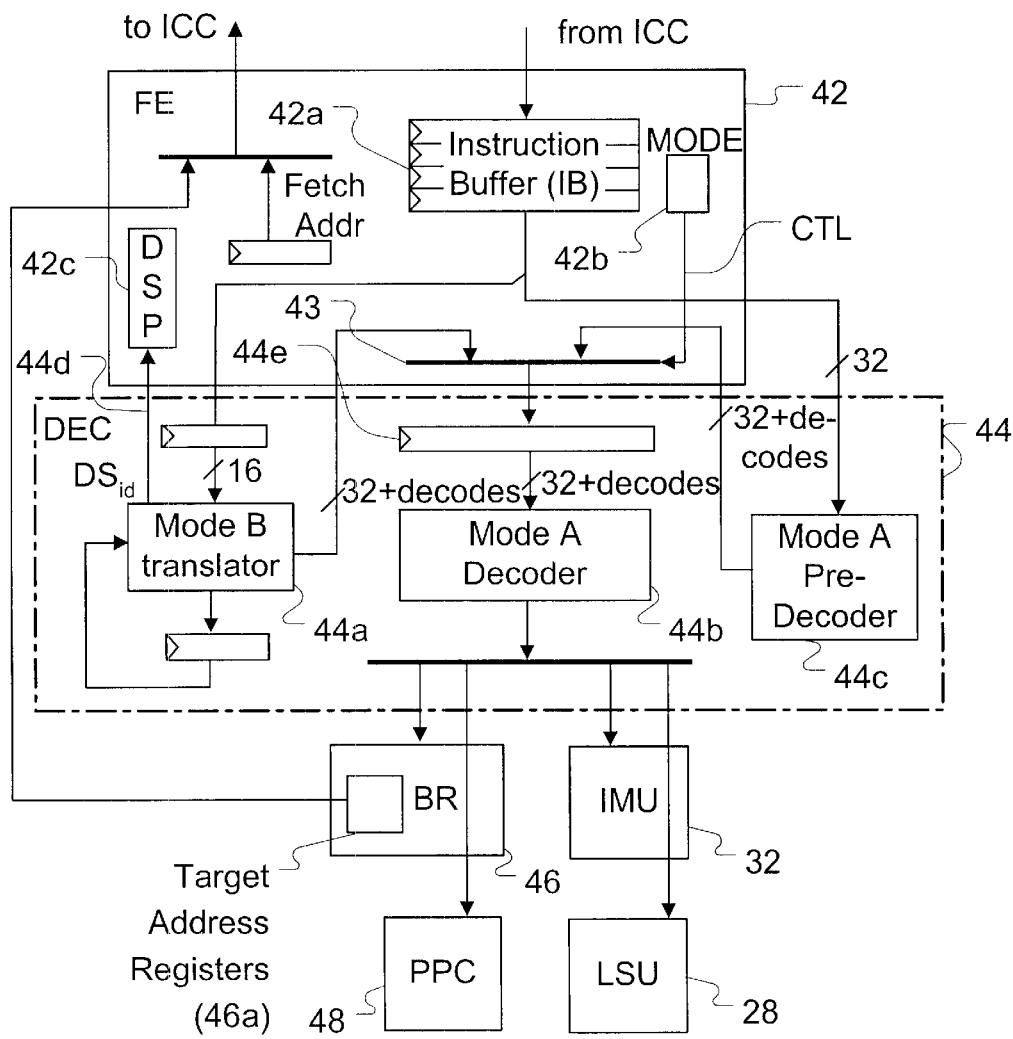
FIG. 4 is a block diagram illustration of the decoder (DEC) shown in FIG. 2.

FIG. 4 illustrates the FE 42 and the DEC 44 in greater detail. As FIG. 4 shows, the instruction buffer (IB) 42a receives instructions fetched from the ICC. Instructions are pulled from the IB 42a and applied to the Mode B translator 44a of the DEC 44 and the Mode A pre-decoder 44c, depending upon the mode of operation (i.e., whether Mode B instructions are being used, and emulated by Mode A instructions, or whether only Mode A instructions are being used). Pre-decoded Mode A instructions (if operating in Mode A) or Mode A instructions from the Mode B translator (if operating in Mode B) are selected by the multiplexer 43 for application to the Mode A decoder 44b. The Mode A pre-decoder will produce the 32-bit instruction, plus some pre-decode signals. The Mode B translator will also produce Mode A 32-bit instructions plus decode signals emulating the pre-decode signals that would be produced by the Mode A pre-decoder if the Mode A instruction had been applied to it.

The FE 42 includes a Mode latch 42b that is set to indicate what mode of execution is present; i.e., are Mode A instructions being executed, or are Mode B instructions being translated to Mode A instructions for execution. The Mode latch 42b controls the multiplexer 43. As will be seen, according to the present invention the mode of instruction execution is determined by the least significant bit (LSB) of the target address of branch instructions. When operating in the Mode A environment, a switch to Mode B is performed using a Mode A unconditional branch instruction (BLINK), with the LSB of the address of the target instruction set to a "0". Switches from Mode B to Mode A are initiated by several of the Mode B branch instructions, using a target address with an LSB set to a "1".

A "delay slot present" (DSP) latch 42c in the FE 42. The DSP 42c is set by a signal from the Mode B translator 44a of the DEC 44 to indicate that a Mode B branch instruction being translated is followed by a delay slot instruction that must be translated, emulated, and executed before the branch can be taken. The DSP 42e will be reset by the FE42 when the delay slot instruction is sent to the Mode B translator 44a for translation.

FIG. 4 shows the DEC 44 as including the Mode B translator 44a, the Mode A decoder 44b, and a Mode A pre-decoder 44c. Mode B instructions are issued from the FE 42, buffered, and applied to the Mode B translator 44a, a state machine implemented circuit that produces, for each Mode B instruction, one or more Mode A instructions. The Mode A instructions produced by the translator 44a are passed through the multiplexor circuit 43 and, after buffering, applied to the Mode A decoder 44b. The decoded instruction, (i.e., operands, instruction signals, etc.) are then conveyed to the execution units.

The operational performance of a processor element is highly dependent on the efficiency of branches. The control flow mechanism has therefore been designed to support low-penalty branching. This is achieved by the present invention by separating a prepare-target (PT) instruction that notifies the CPU of the branch target from the branch instruction that causes control to flow, perhaps conditionally, to that branch target. This technique allows the hardware to be informed of branch targets many cycles in advance, allowing the hardware to prepare for a smooth transition from the current sequence of instructions to the target sequence, should the branch be taken. The arrangement also allows for more flexibility in the branch instructions, since the branches now have sufficient space to encode a comprehensive set of compare operations. These are called folded-compare branches, since they contain both a compare and a branch operation in a single instruction.

Registers used in the Mode B instruction set architecture are typically 32-bits wide, and may be less in number (e.g., 16) than those used for the Mode A instruction set architecture (which number 64, each 64 bits wide). Thus, general purpose registers for Mode B instruction execution are mapped to the low-order 32 bits of 16 of the Mode A general purpose registers of the OF 50. In addition, as mentioned above, signed extension is used; that is, when an operand or other expression of a Mode B instruction is written to a general purpose register of the OF 50, it is written to the lower order bits, (bit positions 0–31) with the most significant bit (bit position 31) copied in the upper bit positions (32–63). In addition, status register states used in the Mode B instruction set are mapped to specific register bits of the Mode A architecture.

An example of the mapping is illustrated in FIG. 5, which shows the state of the earlier developed Mode B instruction set architecture and the Mode A architecture state upon which it is mapped. As with the particular instruction sets, those skilled in this art will recognize that the mappings depend upon the resources available. Thus, the particular mappings shown here are exemplary only, depending upon, as they do, the instruction set architectures involved. FIG. 5 shows the mapping of Mode B state (left-most column) to Mode A state (right-most column). For example, the program counter state of the Mode B architecture is mapped to the low-order bit positions of the program counter of the Mode A architecture.

In addition to register mapping, such state as various flags are also mapped. As FIG. 5 shows, 1-bit flags are mapped to specific bit positions of one or another of the general registers of the Mode A architecture. Thus, for example, the Mode A T, S, M, and Q state/flags are respectively mapped to general purpose registers $R_{25}$ (bit position 0), and the SR 46b (fields S, M, and Q).

Mode A instructions, being 32-bits wide, are stored on 4-byte boundaries; and the Mode B instructions are stored on either 4-byte or 2-byte boundaries. Thus, at least two bits (the LSB and LSB+1) are unused for addressing, and available for identifying the mode of operation. Switching between Mode A and Mode B instruction execution is accomplished using branch instructions that detect the two LSBs of the target address of the branch. When executing Mode A instructions, only an unconditional branch address (BLINK) is able to switch from the Mode A operation to Mode B operation. Thus, the mode of operation can be changed using the LSB of the target address of jump instructions used in Modes A and B instruction set architectures. A "0" in this bit position indicates Mode B target instruction, while a "1" indicates Mode A target instruction. The LSB is used only for mode indication and does not affect the actual target address.

The earlier Mode B instruction set architecture utilized a delay slot mechanism to reduce the penalty incurred for branch operations. The delay slot is the instruction that immediately follows a branch instruction, and is executed before the branch can cause (or not cause) a transition in program flow. As indicated above, a smoother transition can be made by the PT instruction to load a target address register with the target address of a branch well ahead of the branch. However, emulation of a Mode B branch instruction with a delay slot must account for the delay slot. Accordingly when a Mode B branch instruction with a delay slot is encountered, the Mode A code sequence will take the branch, but the target instruction will not be executed until the Mode B instruction following the branch instruction (i.e., the delay slot instruction) is emulated and completed.

Figure 6:
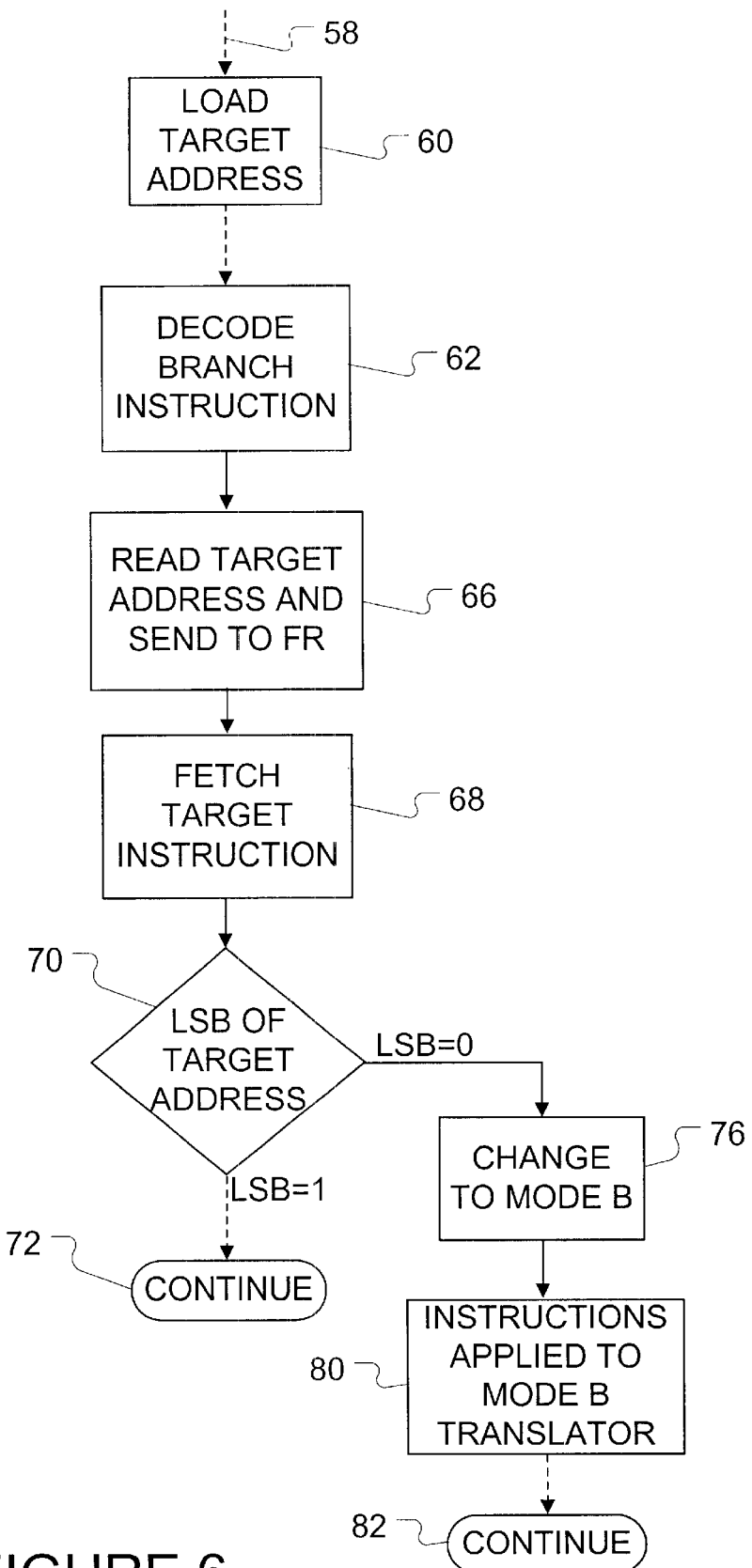
FIG. 6 is a flow diagram illustrating aspects of the invention to control instruction flow.

FIG. 6 illustrates use of aspects of the invention, including employment of the PT instruction in both the Mode A and Mode B environments, respectively, and switching from a Mode A thread 58 to a more compact Mode B thread (steps 64–84), and a return to the Mode A thread.

An understanding of the present invention may best be realized from a description of the operation of branch instructions.

Mode A to Mode A Branch

Referring to FIGS. 4 and 6, assume that while a Mode A instruction stream 58 (FIG. 6) is executing, an unconditional branch is to be taken to another Mode A instruction stream (i.e., no mode switch), using the BLINK instruction. At some time before the BLINK instruction is pulled from the IB 42a for decoding, a PT instruction will load one of the 8 target address registers 46a with the target address to which the branch is to be taken (step 60). Later, the BLINK instruction will reach the top of the IB 42a and will be sent to the Mode A pre-decoder 44c for partial decoding, and then, via the multiplexer 43, to the Mode A decoder 44b of the DEC 44 (step 62). The DEC 44 will send decoded information, including an identification of the target address register 46a containing the address of the target instruction, to the BR 46.

AT step 66, the BR 46 will read the target address from the identified target address register 46a and send it to the FE 42 with a branch command signal. Subsequently, the BR will invalidate all instructions that may be in the execution pipeline following the branch instruction.

Meanwhile, the FE 42 will, in step 68, issue a fetch request to the ICC 40, using the target address received from the BR 46, to fetch the target instruction from the ICU 27 (FIG. 2). The FE 42, at step 70, will check the LSB of the target address. If the LSB is a "0", the FE will know that the target instruction is a Mode B instruction. Here, however, since the target instruction is a Mode A instruction, the LSB will be a "1", and no mode change takes place. At about the same time, the contents of the IB 42a are invalidated in preparation for receipt of the instruction stream of the target instruction and the instructions that follow it. When the target instruction is received from the ICC 40, it is placed in the IB 42a, and from there sent to the DEC 44 for decoding and operation continues in step 72.

Mode Switch: Mode A to Mode B Branch

Assume now that in a Mode A instruction sequence, a switch is to be made to the more compact code of a Mode B sequence. Here is when use of the LSB of a target address comes into play. Initially, the steps 60–68 will be the same as described above, except that step 60 sees the PT instruction loading a target address register 46a with a target address having an LSB set to a "0" to indicate that the target instruction is a Mode B instruction. Then, the BLINK branch instruction that will be used for the switch from Mode A execution to Mode B execution will be sent to the DEC 44 and decoded (step 62). After decoding the BLINK instruction, DEC 44 will send to the BR 46 the identification of the target address register 46a to use for the branch. The BR, in turn, will read the content of the identified target address register 46a, send it to the FE 42 with a branch command signal (step 66), and invalidate any instructions in the execution pipeline following the branch instruction. The FE 42 sends a fetch request, using the target address, to the ICC 40, and receives in return the target instruction(step 68). In addition, at step 70 the FE will now detect that the lower bits (i.e., the LSB) of the target address is a "0" and change its internal mode state (step 76) from Mode A to Mode B by setting the Mode latch 42b accordingly to indicate Mode B operation. The output of the Mode latch 42b will control the multiplexer 43 to communicate instructions from the Mode B translator 44a to the Mode A decoder 44b.

The switch is now complete. The instructions will now be sent to the Mode B translator (step 78) where they are translated to the Mode A instruction(s) that will emulate the Mode B instruction.

Mode B to Mode B Branch

Branches while operating in Mode B are basically as described above. The Mode B branch instruction is translated to a sequence of mode A instructions that will include a PT instruction to load a target register 46a with the address of the target instruction, followed by a Mode A branch instruction to execute the branch (e.g., a BLINK branch instruction). The exception is if the Mode B branch instruction indicates a delay slot instruction following the branch instruction that must be executed before the branch can be taken. If no delay slot instruction follows the Mode B branch instruction, the steps outlined above for the Mode A branch will be performed—preceded by a PT instruction to provide the address of the target instruction.

If a delay slot instruction exists, however, the Mode B translator 44a will, upon decoding the branch instruction and noting that it indicates existence of a delay slot instruction, will assert a DS.d signal to the FE 42 to set a latch 42c in the FE that indicates to the FE that a delay slot is present. When the BR46 sends the branch target address to the FE 42, the FE 42 will invalidate the all contents of the IB 42a except the delay slot instruction. The FE will request the ICC 40 to fetch the target instruction, and when received place it behind the delay slot instruction—if the delay slot instruction has not yet been transferred to the DEC 44. The FE 42 will also examine the LSB of the branch target address. If it is a "0," the Mode bit 42b is left unchanged.

The delay slot instruction is applied to the Mode B translator and translated to produce the Mode A instruction (s) that will emulate it, then the FE 42 will reset the DSP 42c to "0." When the emulation of the delay slot instruction is complete, the branch target instruction is applied to the Mode B translator.

Mode Switch: Mode B to Mode A Branch

Again, the initial steps taken are basically the same as set forth above, even though Mode B instructions are executing. The Mode B branch instruction will be translated by the Mode B translator to produce the Mode A instruction sequences, including a PT instruction to load a target address register with the target address (with an LSB set to a "1") of the Mode A target instruction. The Mode B translator will also issue the DS.d signal to the FE if the Mode B branch instruction has a delay slot instruction following it, setting the DSP latch 42c of the FE to indicate that a delay slot instruction exists. The BR will read the content of the target address, which will have an LSB set to a "1" to indicate that the target is a Mode A instruction, and send it to the FE 42. The BR 46 will then invalidate all instructions in the pipeline following the branch instruction, except the emulation of the delay slot instruction if it happens to be in the pipeline.

Upon receipt of the target address, the FE 42 will issue a fetch request to the ICC 40, using the target address, invalidate the content of the IB 42a, except the delay slot instruction. After the delay slot instruction is translated, the FE 42 will change its mode state by setting the Mode latch to indicate Mode A operation. All further instructions from the IB 42a, including the target instruction, will now be routed by the multiplexer 43 to the Mode A pre-decoder 44c.

APPENDIX A

Mode-B Data Transfer Instruction Emulation Sequences

| Mode-B Instruction | Mode-A Instruction Sequence | In | Out |
|---|---|---|---|
| MOV #imm,Rn<br>1110 nnnn siii iiii | 1 movi #imm,Rn | | |
| MOV.W @(disp,PC),Rn<br>1001 nnnn dddd dddd | 1 mova.w disp,R32<br>2 ld.w R32,#0,Rn | | |
| MOV.L @(disp,PC),Rn<br>1101 nnnn dddd dddd | mova.l disp,R321<br>2 ld.l R32,#0,Rn | | |
| MOV Rm,Rn<br>0110 nnnn mmmm 0011 | 1 addi Rm,#0,Rn | | |
| MOV.B Rm,@Rn<br>0010 nnnn mmmm 0000 | 1 st.b Rn,#0,Rm | | |
| MOV.W Rm,@Rn<br>0010 nnnn mmmm 0001 | 1 st.w Rn,#0,Rm | | |
| MOV.L Rm,@Rn<br>0010 nnnn mmmm 0010 | 1 st.l Rn,#0,Rm | | |
| MOV.B @Rm,Rn<br>0110 nnnn mmmm 0000 | 1 ld.b Rm,#0,Rn | | |
| MOV.W @Rm,Rn<br>0110 nnnn mmmm 0001 | 1 ld.w rm,#0,Rn | | |
| MOV.L @Rm,Rn<br>0110 nnnn mmmm 0010 | 1 ld.l rm,#0,Rn | | |
| MOV.B Rm,@-Rn<br>0010 nnnn mmmm 0100 | 1 st.b Rn,#-1,Rm<br>2 addi.l Rn,#-1,Rn | | |
| MOV.W Rm,@-Rn<br>0010 nnnn mmmm 0101 | 1 st.w Rn,#-1,Rm<br>2 addi.l Rn,#-2,Rn | | |
| MOV.L Rm,@-Rn<br>0010 nnnn mmmm 0110 | 1 strd.w Rn,#-1,Rm<br>2 addi.l Rn,#-4,Rn | | |
| MOV.B @Rm+,Rn<br>0110 nnnn mmmm 0100 | 1 ld.b Rm,#0,Rn<br>2 *if (m!=n)* addi.l Rm,#1,Rm | | |
| MOV.W @Rm+,Rn<br>0110 nnnn mmmm 0101 | 1 ld.w Rm,#0,Rn<br>2 *if (m!=n)* addi.l Rm,#2,Rm | | |
| MOV.L @Rm+,Rn<br>0110 nnnn mmmm 0110 | 1 ld.l Rm,#0,Rn<br>2 *if (m!=n)* addi.l Rm,#4,Rm | | |
| MOV.B R0,@(disp,Rm)<br>1000 0000 mmmm dddd | 1 st.b Rn,disp,R0 | | |
| MOV.W R0,@(disp,Rm)<br>1000 0001 mmmm dddd | 1 st.w Rn,disp,R0 | | |
| MOV.L Rm,@(disp,Rn)<br>0001 nnnn mmmm dddd | 1 st.l Rn,disp,Rm | | |
| MOV.B @(disp,Rm),R0<br>1000 0100 mmmm dddd | 1 ld.b Rm,disp,R0 | | |
| MOV.W @(disp,Rm),R0<br>1000 0101 mmmm dddd | 1 ld.w Rm,disp,R0 | | |

22

| | | | |
|---|---|---|---|
| MOV.L @(disp,Rm),Rn<br>0101 nnnn mmmm dddd | 1 ld.l Rm,disp,Rn | | |
| MOV.B Rm,@(R0,Rn)<br>0000 nnnn mmmm 0100 | 1 stx.b Rn,R0,Rm | | |
| MOV.W Rm,@(R0,Rn)<br>0000 nnnn mmmm 0101 | 1 stx.w Rn,R0,Rm | | |
| MOV.L Rm,@(R0,Rn)<br>0000 nnnn mmmm 0110 | 1 stx.l Rn,R0,Rm | | |
| MOV.B @(R0,Rm),Rn<br>0000 nnnn mmmm 1100 | 1 ldx.b Rm,R0,Rn | | |
| MOV.W @(R0,Rm),Rn<br>0000 nnnn mmmm 1101 | 1 ldx.w Rm,R0,Rn | | |
| MOV.L @(R0,Rm),Rn<br>0000 nnnn mmmm 1110 | 1 ldx.l Rm,R0,Rn | | |
| MOV.B R0,@(disp,GBR)<br>1100 0000 dddd dddd | 1 stx.b R27,disp,R0 | | |
| MOV.W R0,@(disp,GBR)<br>1100 0001 dddd dddd | 1 stx.w R27,disp,R0 | | |
| MOV.L R0,@(disp,GBR)<br>1100 0010 dddd dddd | 1 stx.l R27,disp,R0 | | |
| MOV.B @(disp,GBR),R0<br>1100 0100 dddd dddd | 1 ld.b R27,disp,R0 | | |
| MOV.W @(disp,GBR),R0<br>1100 0101 dddd dddd | 1 ld.w R27,disp,R0 | | |
| MOV.L @(disp,GBR),R0<br>1100 0110 dddd dddd | 1 ld.l R27,disp,R0 | | |
| MOVA @(disp,PC),R0<br>1100 0111 dddd dddd | 1 mova.l disp,R0 | | |
| MOVT Rn<br>0000 nnnn 0010 1001 | 1 andi R25,#1,Rn | | |
| SWAP.B Rm,Rn<br>0110 nnnn mmmm 1000 | 1 byterev Rm,R32<br>2 shlri Rm,#16,Rn<br>3 mextr6 R32,Rn,Rn | Rm | |
| SWAP.W Rm,Rn<br>0110 nnnn mmmm 1001 | 1 mperm.w Rm,#1,R32<br>2 addi.l R32,#0,Rn | | |
| XTRCT Rm,Rn<br>0010 nnnn mmmm 1101 | 1 shlli.l Rm,#16,R32<br>2 shlri.l Rn,#16,Rn<br>3 or Rn,R32,Rn | | |

Arithmetic Instruction Emulation Sequences

| Mode-B instruction | Mode-A Instruction Sequence | In | Out |
|---|---|---|---|
| ADD Rm,Rn<br>0011 nnnn mmmm 1100 | 1 add.l Rm,Rn,Rn | | |
| ADD #imm,Rn<br>0111 nnnn siii iiii | 1 addi.l Rn,#imm,Rn | | |
| ADDC Rm,Rn<br>0011 nnnn mmmm 1110 | 1 addz.l Rm,R63,R32<br>2 addz.l Rn,R63,Rn | | |

|  | 3 add Rn,R32,Rn | | |
|---|---|---|---|
|  | 4 add Rn,R25,Rn | | |
|  | 5 shlri Rn,#32,R25 | | |
|  | 6 addi.l Rn,#0,Rn | | |
| ADDV Rm,Rn | 1 add Rm,Rn,R32 | Rm | |
| 0011 nnnn yccc 1111 | 2 add.l Rm,Rn,Rn | Rn | |
|  | 3 cmpne Rn,R32,R25 | | |
| CMP/EQ #imm,R0 | 1 movi #imm,R32 | R0 | |
| 1000 1000 siii iiii | 2 cmpeq R0,R32,R25 | | |
| CMP/EQ Rm,Rn | 1 cmpeq Rn,Rm,R25 | Rm | |
| 0011 nnnn mmmm 0000 | | Rn | |
| CMP/HS Rm,Rn | 1 cmpgeu Rn,Rm,R25 | Rm | |
| 0011 nnnn mmmm 0010 | | Rn | |
| CMP/GE Rm,Rn | 1 cmpge Rn,Rm,R25 | Rm | |
| 0011 nnnn mmmm 0011 | | Rn | |
| CMP/HI Rm,Rn | 1 cmpgtu Rn,Rm,R25 | Rm | |
| 0011 nnnn mmmm 0110 | | Rn | |
| CMP/GT Rm,Rn | 1 cmpgt Rn,Rm,R25 | Rm | |
| 0011 nnnn mmmm 0111 | | Rn | |
| CMP/PZ Rn | 1 cmpge Rn,R63,R25 | Rn | |
| 0100 nnnn 0001 0001 | | | |
| CMP/PL Rn | 1 cmpgt Rn,R63,R25 | Rn | |
| 0100 nnnn 0001 0101 | | | |
| CMP/STR Rm,Rn | 1 mcmpeq.b Rm,Rn,R32 | | |
| 0010 nnnn mmmm 1100 | 2 addz.l R32,R63,R32 | | |
|  | 3 cmpgtu R32,R63,R25 | | |
| DIV0S Rn,Rm | 1 xor Rn,Rm,R32 | | |
| 0010 nnnn mmmm 0111 | 2 ori Rn,#0,R33 | | |
|  | 3 ori Rm,#0,R33 | | |
|  | 4 shlri.l R32,#31,R32 | | |
|  | 5 xori R32,#1,R25 | | |
|  | Q.d = PPF_EX2[63] | | |
|  | 6 nop | | |
|  | M.d = PPF_EX2[63] | | |
|  | #1.5 dec_br_sr_update = 1 | | |
| DIV0U | 1 movi #0,R25 | | |
| 0000 0000 0001 1001 | Q.d = 0 | | |
|  | M.d = 0 | | |
|  | #1.5 dec_br_sr_update = 1 | | |
| DIV1 Rm,Rn | 1 addz.l Rm,R63,R32 | | |
| 0011 nnnn mmmm 0100 | 2 ori Rn,#0,R33 | | |
|  | oldQ.d = Q.q | | |
|  | 3 shlli.l Rn,#1,Rn | | |
|  | 4 addz.l Rn,R25,Rn | | |
|  | 5 if (oldQ.q == M.q) sub Rn,R32,Rn | | |
|  |          else add Rn,R32,Rn | | |
|  | Q.d = PPF_EX2[63] | | |
|  | 6 addi.l Rn,#0,Rn | | |
|  | oldQ.d = Q.q ^ M.q | | |

|  |  |  |  |
|---|---|---|---|
|  | 7 nop<br>8 nop<br>Q.d = oldQ.q ^ PPF_EX2[32]<br>9 if (Q.q == 1) movi #1,R25<br>    else movi #0,R25<br>#1.5 dec_br_sr_update = 1 |  |  |
| DT Rn<br>0100 nnnn 0001 0000 | 1 addi.l Rn,#-1,Rn<br>2 cmpeq Rn,R63,R25 |  |  |
| DMULS.L Rm,Rn<br>0011 nnnn mmmm 1101 | 1 muls.l Rm,Rn,R24 |  |  |
| DMULU.L Rm,Rn<br>0011 nnnn mmmm 0101 | 1 mulu.l Rm,Rn,R24 |  |  |
| EXTS.B Rm,Rn<br>0110 nnnn mmmm 1110 | 1 shlli Rm,#56,Rn<br>2 shari Rn,#56,Rn |  |  |
| EXTS.W Rm,Rn<br>0110 nnnn mmmm 1111 | 1 shlli Rm,#48,Rn<br>2 shari Rn,#48,Rn |  |  |
| EXTU.B Rm,Rn<br>0110 nnnn mmmm 1100 | 1 andi Rm,#255,Rn |  |  |
| EXTU.W Rm,Rn<br>0110 nnnn mmmm 1111 | 1 shlli Rm,#48,Rn<br>2 shlri Rn,#48,Rn |  |  |
| MUL.L Rm,Rn<br>0000 nnnn mmmm 0111 | 1 mulu.l Rm,Rn,R32<br>2 shlri R24,#32,R24<br>3 mshflo.l R32,R24,R24 |  |  |
| MULS.W Rm,Rn<br>0010 nnnn mmmm 1111 | 1 mmullo.wl Rm,Rn,R32<br>2 shlri R24,#32,R24<br>3 mshflo.l R32,R24,R24 |  |  |
| MULU.W Rm,Rn<br>0010 nnnn mmmm 1110 | 1 shlli Rm,#48,R32<br>2 shlli Rn,#48,R33<br>3 shlri R32,#48,R32<br>4 shlri R33,#48,R33<br>5 mulu.l R32,R33,R32<br>6 shlri R24,#32,R24<br>7 mshflo.l R32,R24,R24 |  |  |
| NEG Rm,Rn<br>0110 nnnn mmmm 1011 | 1 sub.l R63,Rm,Rn |  |  |
| NEGC Rm,Rn<br>0110 nnnn mmmm 1010 | 1 addz.l Rm,R63,R32<br>2 sub R63,R25,Rn<br>3 sub Rn,R32,Rn<br>4 shlri Rn,#32,R25<br>5 addi.l Rn,#0,Rn | Rm |  |
| SUB Rm,Rn<br>0011 nnnn mmmm 1000 | 1 sub.l Rn,Rm,Rn |  |  |
| SUBC Rm,Rn<br>0110 nnnn mmmm 1010 | 1 addz.l Rm,R63,R32<br>2 addz.l Rn,R63,Rn<br>3 sub Rn,R25,Rn<br>4 sub Rn,R32,Rn<br>5 shlri Rn,#32,R25<br>6 addi.l Rn,#0,Rn |  |  |

| | | |
|---|---|---|
| SUBV Rm,Rn<br>0110 nnnn mmmm 1011 | 1 sub Rn,Rm,R32<br>2 sub.l Rn,Rm,Rn<br>1 cmpne Rn,R32,R25 | Rm<br>Rn |
| MAC.L @Rm+,@Rn+<br>0000 nnnn mmmm 1111 | 1 ld.l Rn,#0,R32<br>2 if (m == n) ld.l Rm,#4,R33<br>      else ld.l Rm,#0,R33<br>3 addi.l Rn,#4,Rn<br>4 muls.l R32,R33,R32<br>5 addi.l Rm,#4,Rm<br>6 add R32,R24,R24<br>  if (S.q == 1) {<br>7  movi #-1,R33<br>8  shlri R33,#17,R33<br>9  xori R33,#-1,R32<br>10 cmpgt R24,R63,R34<br>11 cmvne R34,R33,R32<br>12 nsb R24,R33<br>13 movi #16,R34<br>14 cmpgt R34,R33,R34<br>15 cmvne R34,R32,R24} | |
| MAC.W @Rm+,@Rn+<br>0100 nnnn mmmm 1111 | 1 ld.w Rn,#0,R32<br>2 if (m == n) ld.w Rm,#2,R33<br>      else ld.w Rm,#0,R33<br>3 addi.l Rn,#2,Rn<br>4 muls.l R32,R33,R32<br>5 addi.l Rm,#2,Rm<br>6 add R32,R24,R24<br>  if (S.q == 1) {<br>7  movi #-1,R33<br>8  shlri R33,#33,R33<br>9  movi #3,R32<br>10 shlli R32,#32,R32<br>11 cmpgt R24,R63,R34<br>12 cmvne R34,R33,R32<br>13 nsb R24,R33<br>14 movi #16,R34<br>15 cmpgt R34,R33,R34<br>16 cmvne R34,R32,R24} | |

APPENDIX B

ADD.L

Description:

The ADD.L instruction adds the low 32 bits of $R_m$ to the low 32 bits of $R_n$ and stores the sign-extended 32-bit result in $R_d$. Bits $R_{m<32\ FOR\ 32>}$ and $R_{n<32\ FOR\ 32>}$ are ignored.

Operation:

ADD.L

| 000000 | m | 1000 | n | d | r |
|---|---|---|---|---|---|
| 31 | 26 25 | 20 19 | 16 15 | 10 9 | 4 3  0 |

| ADD.L $R_m$, $R_n$, $R_d$ |
|---|
| source1 ← SignExtend$_{32}$($R_m$);<br>source2 ← SignExtend$_{32}$($R_n$);<br>result ← SignExtend$_{32}$(source1 + source2);<br>$R_d$ ← Register(result); |

ADDZ.L

Description:

The ADDZ.L instruction adds the low 32 bits of $R_m$ to the low 32 bits of $R_n$ and stores the zero-extended 32-bit result in $R_d$. Bits $R_{m<32\ FOR\ 32>}$ and $R_{n<32\ FOR\ 32>}$ are ignored.

Operation:

ADDZ.L

| 000000 | m | 1100 | n | d | r |
|---|---|---|---|---|---|
| 31 | 26 25    20 19 | 16 15 | 10 9 | 4 3 | 0 |

| ADDZ.L $R_m$, $R_n$, $R_d$ |
|---|
| source1 ← ZeroExtend$_{32}$($R_m$);<br>source2 ← ZeroExtend$_{32}$($R_n$);<br>result ← ZeroExtend$_{32}$(source1 + source2);<br>$R_d$ ← Register(result); |

ADDI.L

Description:

The ADDI.L instruction adds the low 32 bits of $R_m$ to the sign-extended value of the immediate $s$, and stores the sign-extended 32-bit result in the register $R_d$. Bits $R_{m<32\ FOR\ 32>}$ are ignored.

Operation:

ADDI.L

| 110101 | m | s | d | r |
|---|---|---|---|---|
| 31 | 26 25 | 20 19 | 10 9 | 4 3  0 |

| ADDI.L $R_m$, s, $R_d$ |
|---|
| source1 ← SignExtend$_{32}$($R_m$); <br> source2 ← SignExtend$_{10}$(s); <br> result ← SignExtend$_{32}$(source1 + source2); <br> $R_d$ ← Register(result); |

SHLLI.L

Description:

The SHLLI.L instruction logically left shifts the lower 32 bits of $R_m$ by $s_{<0 \text{ FOR } 5>}$ and stores the sign-extended 32-bit result in $R_d$.

Operation:

SHLLI.L

| 110001 | m | 0000 | s | d | r |
|---|---|---|---|---|---|
| 31  26 | 25  20 | 19  16 | 15  10 | 9  4 | 3  0 |

| SHLLI.L $R_m$, s, $R_d$ |
|---|
| source1 ← ZeroExtend$_{32}$($R_m$); |
| source2 ← ZeroExtend$_5$(SignExtend$_6$(s)); |
| result ← SignExtend$_{32}$(source1 << source2); |
| $R_d$ ← Register(result); |

SHLRI.L

Description:

The SHLRI.L instruction logically right shifts the lower 32 bits of $R_m$ by $s_{<0\ \text{FOR}\ 5>}$ and stores the sign-extended 32-bit result in $R_d$.

Operation:

SHLRI.L

| 110001 | m | 0010 | s | d | r |
|---|---|---|---|---|---|
| 31 | 26 25 | 20 19 | 16 15 | 10 9 | 4 3 0 |

| SHLRI.L $R_m$, s, $R_d$ |
|---|
| source1 ← ZeroExtend$_{32}$($R_m$); |
| source2 ← ZeroExtend$_5$(SignExtend$_6$(s)); |
| result ← SignExtend$_{32}$(source1 >> source2); |
| $R_d$ ← Register(result); |

SHLLD.L

Description:

The SHLLD.L instruction logically left shifts the lower 32 bits of $R_m$ by $R_{n<0\ FOR\ 5>}$ and stores the sign-extended 32-bit result in $R_d$.

Operation:

SHLLD.L

| 000001 | m | 0000 | n | d | r |
|---|---|---|---|---|---|
| 31 26 | 25 20 | 19 16 | 15 10 | 9 4 | 3 0 |

| SHLLD.L $R_m$, $R_n$, $R_d$ |
|---|
| source1 ← ZeroExtend$_{32}$($R_m$);<br>source2 ← ZeroExtend$_5$($R_n$);<br>result ← SignExtend$_{32}$(source1 << source2);<br>$R_d$ ← Register(result); |

SHLRD.L

Description:

The SHLRD.L instruction logically right shifts the lower 32 bits of $R_m$ by $R_{n<0\ FOR\ 5>}$ and stores the sign-extended 32-bit result in $R_d$.

Operation:

SHLRD.L

| 000001 | m | 0010 | n | d | r |
|---|---|---|---|---|---|
| 31 | 26 25 | 20 19 | 16 15 | 10 9 | 4 3 0 |

| SHLRD.L $R_m$, $R_n$, $R_d$ |
|---|
| source1 ← ZeroExtend$_{32}$($R_m$);<br>source2 ← ZeroExtend$_{5}$($R_n$);<br>result ← SignExtend$_{32}$(source1 >> source2);<br>$R_d$ ← Register(result); |

SHARD.L

Description:

The SHARD.L instruction arithmetically right shifts the lower 32 bits of $R_m$ by $R_{n<0\ FOR\ 5>}$ and stores the sign-extended 32-bit result in $R_d$.

Operation:

SHARD.L

| 000001 | m | 0110 | n | d | r |
|---|---|---|---|---|---|
| 31 | 26 25 | 20 19 | 16 15 | 10 9 | 4 3  0 |

| SHARD.L $R_m$, $R_n$, $R_d$ |
|---|
| source1 ← SignExtend$_{32}$($R_m$);<br>source2 ← ZeroExtend$_5$($R_n$);<br>result ← SignExtend$_{32}$(source1 >> source2);<br>$R_d$ ← Register(result); |

LDHI.L

Description:

Load the high part of a misaligned, signed long-word from memory to a general-purpose register.

Operation:

LDHI.L

| 110000 | m | 0110 | s | d | r |
|---|---|---|---|---|---|
| 31 | 26 25 · · 20 19 | 16 15 | 10 9 | 4 3 | 0 |

| LDHI.L $R_m$, s, $R_d$ |
|---|
| base ← ZeroExtend$_{64}$($R_m$); <br> offset ← SignExtend$_6$(s); <br> address ← base + offset; <br> count ← (address ∧ 0x3) + 1; <br> address ← ZeroExtend$_{64}$(address ∧ (~ 0x3)); <br> count8 ← count × 8; <br> shift ← ZeroExtend$_5$((~ ((base + offset) ∧ 0x3)) × 8); <br> mem ← ZeroExtend$_{count8}$(MisalignedReadMemory$_{count8}$(address)); <br> IF (IsLittleEndian()) <br>    result ← SignExtend$_{32}$(mem << shift); <br> ELSE <br>    result ← ZeroExtend$_{32}$(mem); <br> $R_d$ ← Register(result); |

LDLO.L

Description:

Load the low part of a misaligned, signed long-word from memory to a general-purpose register.

Operation:

LDLO.L

| 110000 | m | 0010 | s | d | r |
|---|---|---|---|---|---|
| 31 | 26 25 | 20 19 | 16 15 | 10 9 | 4 3  0 |

```
LDLO.L Rm, s, Rd base ← ZeroExtend₆₄(Rm);
offset ← SignExtend₆(s);
address ← ZeroExtend₆₄(base + offset);
count ← 4 - (address ∧ 0x3);
count8 ← count × 8;
shift ← (address ∧ 0x3) × 8;
mem ← ZeroExtend_count8(MisalignedReadMemory_count8(address));
IF (IsLittleEndian())
    result ← ZeroExtend₃₂(mem);
ELSE
    result ← SignExtend₃₂(mem << shift);
Rd ← Register(result);
```

STHI.L

Description:

Misaligned store of the high part of a long-word from a general-purpose register to memory.

Operation:

STHI.L

| 111000 | m | 0110 | s | y | r |
|---|---|---|---|---|---|
| 31 | 26 25 | 20 19 | 16 15 | 10 9 | 4 3  0 |

STHI.L $R_m$, s, $R_y$ base ← ZeroExtend$_{64}$($R_m$);
offset ← SignExtend$_6$(s);
value ← ZeroExtend$_{32}$($R_y$);
address ← base + offset;
count ← (address ∧ 0x3) + 1;
address ← ZeroExtend$_{64}$(address ∧ (~ 0x3));
IF (IsLittleEndian())
   start ← (4 - count) × 8;
ELSE
   start ← 0;
count8 ← count × 8;
MisalignedWriteMemory$_{count8}$(address, value$_{< start\ FOR\ count8\ >}$);

STLO.L

Description:

Misaligned store of the low part of a long-word from a general-purpose register to memory.

Operation:

STLO.L

| 111000 | m | 0010 | s | y | r |
|---|---|---|---|---|---|
| 31 | 26 25 | 20 19 | 16 15 | 10 9 | 4 3  0 |

| STLO.L $R_m$, s, $R_y$ |
|---|
| base ← ZeroExtend$_{64}$($R_m$);<br>offset ← SignExtend$_6$(s);<br>value ← ZeroExtend$_{32}$($R_y$);<br>address ← ZeroExtend$_{64}$(base + offset);<br>count ← 4 - (address ∧ 0x3);<br>IF (IsLittleEndian())<br>   start ← 0;<br>ELSE<br>   start ← (4 - count) × 8;<br>count8 ← count × 8;<br>MisalignedWriteMemory$_{count8}$(address, value$_{<\text{start FOR count8}>}$); |

What is claimed is:

1. A processor element operable to execute N-bit instructions, including an N-bit branch instruction, or M-bit instructions, including an M-bit branch instruction, where M and N are integers, and M is less than N, the processor element executing the M-bit instructions according to the steps of:

indicating in the M-bit branch instruction a target address of an M-bit target instruction and an M-bit delay slot instruction immediately following the M-bit branch instruction in a sequence of M-bit instructions;

emulating the M-bit branch instruction with a sequence of N-bit instructions that includes a prepare target instruction for loading a target register with the target address and the N-bit branch instruction;

using the target address with the N-bit branch to complete execution of the M-bit branch instruction; and emulating the delay slot instruction with a sequence of one or more N-bit instructions that are executed before execution of the N-bit instructions that emulate the M-bit target instruction.

2. The method of claim 1, wherein the M-bit branch instruction is a multiple-bit word, and including the step of providing the M-bit branch instruction with a one of the multiple bits set to a predetermined digital state to indicate the delay slot instruction, and wherein the detecting step includes detecting the digital state.

3. The method of claim 2, wherein the one of the multiple bits is set to another digital state to indicate the lack of a delay slot instruction.

* * * * *